United States Patent
Sabato et al.

(10) Patent No.: US 8,452,761 B2
(45) Date of Patent: May 28, 2013

(54) APPARATUS FOR AND METHOD OF IMPLEMENTING SYSTEM LOG MESSAGE RANKING VIA SYSTEM BEHAVIOR ANALYSIS

(75) Inventors: Sivan Sabato, Mazkeret Batya (IL);
Aviad Tsherniak, Cambridge, MA (US);
Elad Yom-Tov, DN Hamovil (IL)

(73) Assignee: International Business Machines Corporation, Armonk, NY (US)

( * ) Notice: Subject to any disclaimer, the term of this patent is extended or adjusted under 35 U.S.C. 154(b) by 816 days.

(21) Appl. No.: 11/877,679

(22) Filed: Oct. 24, 2007

(65) Prior Publication Data

US 2009/0113246 A1 Apr. 30, 2009

(51) Int. Cl.
G06F 7/00 (2006.01)

(52) U.S. Cl.
USPC ........... 707/723; 707/727; 707/730; 707/737; 715/201

(58) Field of Classification Search
USPC ........................................................ 707/723
See application file for complete search history.

(56) References Cited

U.S. PATENT DOCUMENTS

| | | | |
|---|---|---|---|
| 5,847,972 A * | 12/1998 | Eick et al. .................... | 709/246 |
| 6,173,418 B1 | 1/2001 | Fujino et al. | |
| 6,650,949 B1 | 11/2003 | Fera et al. | |
| 7,124,060 B1 | 10/2006 | Eriksson et al. | |
| 2005/0114321 A1 | 5/2005 | Destefano et al. | |
| 2006/0184529 A1 | 8/2006 | Berg et al. | |
| 2006/0195297 A1 * | 8/2006 | Kubota et al. ................. | 702/187 |
| 2008/0172422 A1 * | 7/2008 | Li et al. ......................... | 707/202 |

OTHER PUBLICATIONS

Girardin, Luc and Brodbeck, Dominique. A Visual Approach for Monitoring Logs. Usenix, Dec. 6-11, 1998.*
Joe Higgins, "System for observing user behavior to rank computer log messages", Research Disclosure, n 503, Mar. 2006, p. 243-244.
R. Vaarandi et al, "A data clustering algorithm for mining patterns from event logs", Proceedings of the 3rd IEEE Workshop on IP Operations & Management (IPOM 2003) (IEEE Cat. No. 03EX764), 2003, 119-26.
Wei Peng et al, "Mining logs files for computing system management", Proceedings. Second International Conference on Autonomic Computing, 2005, 309-10.
Luc Girardin et al., "A Visual Approach for Monitoring Logs", UBS, Ubilab.
Sivan Sabato et al., "Analyzing System Logs: A New View of What's Important", SysML Workshop, Apr. 2007.

* cited by examiner

*Primary Examiner* — Shyue Jiunn Hwa
*Assistant Examiner* — Tuan-Khanh Phan
(74) *Attorney, Agent, or Firm* — Howard Zaretsky

(57) ABSTRACT

A novel and useful method for enabling system logs to be effectively and efficiently monitored by ranking the system log messages by their estimated value to administrators and generating a log view that displays the most important messages. The ranking process uses a dataset of system logs from many computer systems to score messages. For better scoring, unsupervised clustering is used to identify sets of systems that behave similarly. The expected distribution of messages in a given system is estimated using the resulting clusters, and log messages are scored using this estimation.

20 Claims, 6 Drawing Sheets

| MERGED LOG – [SHOW ALL 3084 EVENTS] | | |
|---|---|---|
| TIME STAMP | LOG NAME | MESSAGE |
| 06/08/2006 09:27:24 | SecurityEvent | User Logoff: User Name: MFPC829$ Domain: NT_STHMF2 Logon ID: (0x0,0x33EEAB3) Logon Type: 3 |
| 06/08/2006 09:27:23 | SecurityEvent | Successful Network Logon: User Name MFPC829$ Domain: NT_STHMF2 Logon ID: (0x0,0x33EEABB) Logon Type: 3 Logon Process: Kerberos Authentication Package: Kerberos Workstation Name: Logon GUID: {09edeb8a–6cac–a533–b071–7e478bb526d2} Caller User Name: – Caller Domain: – Caller Login ID: – Caller Process ID: – Transited Services: – Source Network Address: 172.21.63.15 Source Port: 0 |
| 06/08/2006 09:27:23 | SecurityEvent | User Logoff: User Name: MFPC829$ Domain: NT_STHMF2 Logon ID: (0x0,0x33EEABB) Logon Type: 3 |
| 06/08/2006 09:27:23 | SecurityEvent | Successful Network Logon: User Name MFPC829$ Domain: NT_STHMF2 Logon ID: (0x0,0x33EEAB3) Logon Type: 3 Logon Process: Kerberos Authentication Package: Kerberos Workstation Name: Logon GUID: {09edeb8a–6cac–a533–b071–7e478bb526d2} Caller User Name: – Caller Domain: – Caller Login ID: – Caller Process ID: – Transited Services: – Source Network Address: 172.21.63.15 Source Port: 0 |
| 06/08/2006 09:27:22 | SecurityEvent | User Logoff: User Name: ottar Domain: NT_STHMF2 Logon ID: (0x0,0x33EE95E) Logon Type: 3 |
| 06/08/2006 09:27:22 | SecurityEvent | Special privileges assigned to new logon: User Name: ottar Domain: NT_STHMF2 Logon ID: (0x0,0x33EE95E) Privileges: SeSecurityPrivilege SeBackupPrivilege SeRestorePrivilege SeTakeOwnershipPrivilege SeDebugPrivilege SeSystemEnvironmentPrivilege SeLoadDriverPrivilege SeImpersonatePrivilege |
| 06/08/2006 09:27:22 | SecurityEvent | Successful Network Logon: User Name: ottar Domain: NT_STHMF2 Logon ID: (0x0,0x33EE95E) Logon Type: 3 Logon Process: Authz Authentication Package: Kerberos Workstation Name: MFXP2$ Logon GUID: – Caller User Name: MFXP2$ Caller Domain: NT_STHMF2 Caller Logon ID: (0x0,0x3E7) Caller Process ID: 1388 Transited Services: – Source Network Address: – Source Port: – |
| 06/08/2006 09:27:22 | SecurityEvent | Logon attempt using explicit credentials: Logged on user: User Name: MFXP2$ Domain: NT_STHMF2 Logon ID: (0x0,0x3E7) Logon GUID: – User whose credentials were used: Target User Name: ottar Target Domain: NT_STHMF2 Target Logon GUID: – Target Server Name: localhost Target Server Info: localhost Caller Process ID: 1388 Source Network Address: – Source Port: – |
| 06/08/2006 09:27:22 | SystemEvent | The DSAPMem service was successfully sent a start control |

FIG.1
PRIOR ART

MELODY LOG ANALYSIS

FROM: 02/05/2007  TO: 02/05/2007  [RESET]
1 bar = 18.5 hours
Bar height is proportional to score

| Score | Meaning |
|---|---|
| 101 | Very rare |
| 95–100 | Quite rate, or appears much more than usual |
| 80–94 | Appears more than usual |
| 0–79 | Appears as normally expected |

| SCORE | No. | TIME LINE | LOG TYPE | START EVENT | MESSAGE |
|---|---|---|---|---|---|
| 100 | 2 | | IPMI | 02/04/2007 08:51:53 | : Memory – ): Assertion: Memory Scrub Failed (stuck bit). DIMM/SIMM/RIMM 1. |
| 100 | 35 | | Windows | 02/23/2007 09:27:41 | MSSQLServerOLAPService: [502]: User CHCDOMAIN/ryu, logger in from computer carmbdpw2.CHC.DOMAIN, doe.... |
| 100 | 16 | | Windows | 02/22/2007 16:07:22 | MSSQLServerOLAPService: [124]: Relational data provider reported error. [Login failed 'or user'CHCD... |
| 99 | 5 | | Windows | 03/16/2007 09:55:40 | Security: [601]: Attempt to install service: Service Name:* Service File Name:*\*\.sys.... |
| 99 | 289 | | Windows | 03/16/2007 09:55:01 | Security: [567]: Object Access Attempt: Object Server: Security Handle ID:* Object Type:.... |
| 99 | 194 | | Windows | 03/16/2007 09:54:56 | Service Control Manager: [7040]: The start type of the ** service was changed from * to * start. |
| 99 | 10 | | Windows | 03/16/2007 09:54:56 | Security: [564]: Object Deleted: Object Server: Security Handle ID:* Process ID : 660 ... |
| 99 | 107 | | Windows | 03/16/2007 09:50:42 | TermServDevices: [1114]: Error communicating with the Spooler system service. Open the Services sna... |
| 99 | 9 | | Windows | 03/16/2007 09:50:29 | Director Agent [3]: Voltage Sensor* reports normal. |
| 99 | 2 | | Windows | 03/16/2007 09:49:59 | Director Agent [3]: Temperature Sensor* reports normal. |
| 99 | 11 | | Windows | 03/16/2007 09:49:52 | Director Agent [3]: Fan Sensor* reports normal. |

FIG.5

APPARATUS FOR AND METHOD OF IMPLEMENTING SYSTEM LOG MESSAGE RANKING VIA SYSTEM BEHAVIOR ANALYSIS

FIELD OF THE INVENTION

The present invention relates to the field of monitoring system performance, and more particularly relates to a method of ranking system log messages by their estimated value to administrators and generating a log view that displays the most important messages.

BACKGROUND OF THE INVENTION

System logs, such as Windows System logs or Linux system logs, are an important resource of information for computer system management. These logs hold text messages emitted from various sources in the computer system during its day-to-day operation. Emitted messages may be informational, or they can indicate a problem in the system, whether trivial or more serious.

Types of system logs include security logs, application logs and system logs. Security logs track information such as user login attempts and completions. Application logs track when an application (e.g. an antivirus program) started, operations performed by the application and when the application finished. System logs store operating system events, including notification of a component failure. If desired, different system logs can be combined to create a merged log. Logs are generally structured as a first in first out (FIFO) queue with the capability of storing thousands of messages. The queue structure prevents the log from growing to an unreasonable size, as the oldest entry is dropped when a new entry is added.

An example prior art merged log is shown in FIG. 1. The system log, generally referenced 10, comprises a table of log entries. Each log entry comprises a time stamp 12 indicating when the event occurred, a log name 14 indicating what type of event occurred and a message 16 which provides further detail on the event. Note that this is a single screen displaying nine entries from the merged log. Note that this particular log contains additional fields that are not displayed (e.g., message source). Since logs can contain thousands of entries, navigating the log can be a cumbersome task.

Periodic monitoring of system logs by system administrators allows the identification of anomalies and security breaches in the system. In addition, the information in system logs is vital for problem diagnosis. In reality, system logs hold a large number of messages, most of which are not interesting to the user. It is time-consuming and sometimes impossible to manually find the key messages in this abundance of information. For example, if a problem arises, a user would call a help desk, and send the merged system log for analysis. A technician working at the help desk would then analyze the system log and try to pinpoint the problem. This can be a difficult and time consuming task since logs typically contain thousands of entries.

There have been various approaches to finding an effective method to parse these system logs. One approach is to have a human expert define a set of message patterns to find, along with desired actions to be taken when encountering them. However, the effort invested in writing and maintaining these rules is proportional to the number of message types and the rate at which they change. Another approach for log analysis focuses on summarizing the log data in a meaningful way, for example by either showing a succinct representation of the log data, by graphically showing patterns in the data or by presenting time statistics of messages.

Other previous approaches to log file analysis include log data pattern detection, message frequency analysis, the grouping of time correlated messages and the use of text analysis algorithms to categorize messages. A limitation of these tactics is that their analysis is solely based on the log data of the inspected computer system and is therefore limited to analyzing that specific system. While these previous approaches to system log monitoring could be used to monitor a server farm, the limitation of these approaches require that the server farm consist of homogeneous computers all performing the same tasks by running the same software on the same hardware.

System log monitoring is becoming more time consuming as the number of systems proliferates. Aside from desktop computers, large scale computer networks and server farms include computers such as file servers, web servers, email servers, data base servers etc. In addition the increased implementation of virtualization enables multiple virtual operating systems (e.g., Windows and Linux) to run on a single computer simultaneously, with each virtual machine generating its own system logs.

Therefore, there is a need for a system log analysis mechanism that is able to automatically analyze system logs and detect events that may indicate potential problems. The mechanism should be fully autonomous, be operating system independent and provide a useful targeted summary of key events taking place on all of the monitored systems. In addition, the mechanism should allow new computers to be monitored automatically as they are installed on the network, without the need for a supervised step of appropriately categorizing system log messages for each computer. By automatically monitoring systems, the mechanism should be able to detect problems at an early stage and be capable of detecting systems that are not configured correctly.

SUMMARY OF THE INVENTION

The present invention provides a solution to the prior art problems discussed supra by ranking system log messages by their estimated value to administrators and generating a log view that displays the most important messages. The ranking process uses a dataset of system logs from many computer systems to score messages. For better scoring, unsupervised clustering is used to identify sets of systems that behave similarly. The expected distribution of messages in a given system is estimated using the resulting clusters, and log messages are scored using this estimation.

The present invention operates in two phases, training and operation. During training, multiple log files are clustered. The clustering is based on the messages, but is indicative of actual use. The present invention measures the difference in the ranking of system log messages by their frequency to obtain better clustering results.

During operation, a log file from a new system is matched to the most similar cluster, where similarity is measured according to the frequencies of its log messages. The messages with the most atypical frequency (i.e. compared to their frequency in the most similar cluster) are ranked highest and displayed. This method enables the identification of abnormal events (or ranking events according to their perceived abnormality) compared to systems which have similar uses. This process is completely unsupervised.

The invention is operative to facilitate the development of analytic tools to monitor the performance of any system generating a system log file. Automated analysis of system log files will help optimize system performance and help in the timely isolation and identification of any problems, should they occur. Both system support costs and system downtime can be reduced since the present invention provides a more efficient method for centralized help desks to detect system problems. Alternatively, the present invention can also be implemented at the remote system itself (i.e. the one to be analyzed), thereby enabling any system problems to be addressed by either the user or the local system administrator.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the invention, a method of analyzing system logs, the method comprising the steps of creating at least one system profile representing a type of system, matching a system log to be analyzed to the most similar system profile, calculating a score for each system log message from said system log to be analyzed and ranking said scored plurality of system log message in order to identify any atypical system log messages.

There is also a method of defining one or more system profiles for use in the analysis of system logs, the method comprising the steps of collecting a plurality of system logs, preprocessing messages from said system log into a canonical form, creating a count vector for each system log representing the frequency that each said preprocessed message appears in said system log, clustering said count vectors into said one or more system profiles and calculating an average count vector for said one or more system profiles representing the average frequency that each said preprocessed appears in said count vectors of said profile.

There is further a method of ranking system log messages according to their severity, the method comprising the steps of preprocessing said system log messages into a canonical form, creating a count vector from said preprocessed system log messages representing the frequency that each said preprocessed message appears, matching said count vector to a system profile and calculating a score for each preprocessed system log message.

BRIEF DESCRIPTION OF THE DRAWINGS

The invention is herein described, by way of example only, with reference to the accompanying drawings, wherein:

FIG. 1 is an example of a system log illustrating the prior art;

FIG. 5 is an example of a system log illustrating the system log message ranking method of the present invention;

DETAILED DESCRIPTION OF THE INVENTION

Notation Used Throughout

Figure 2:
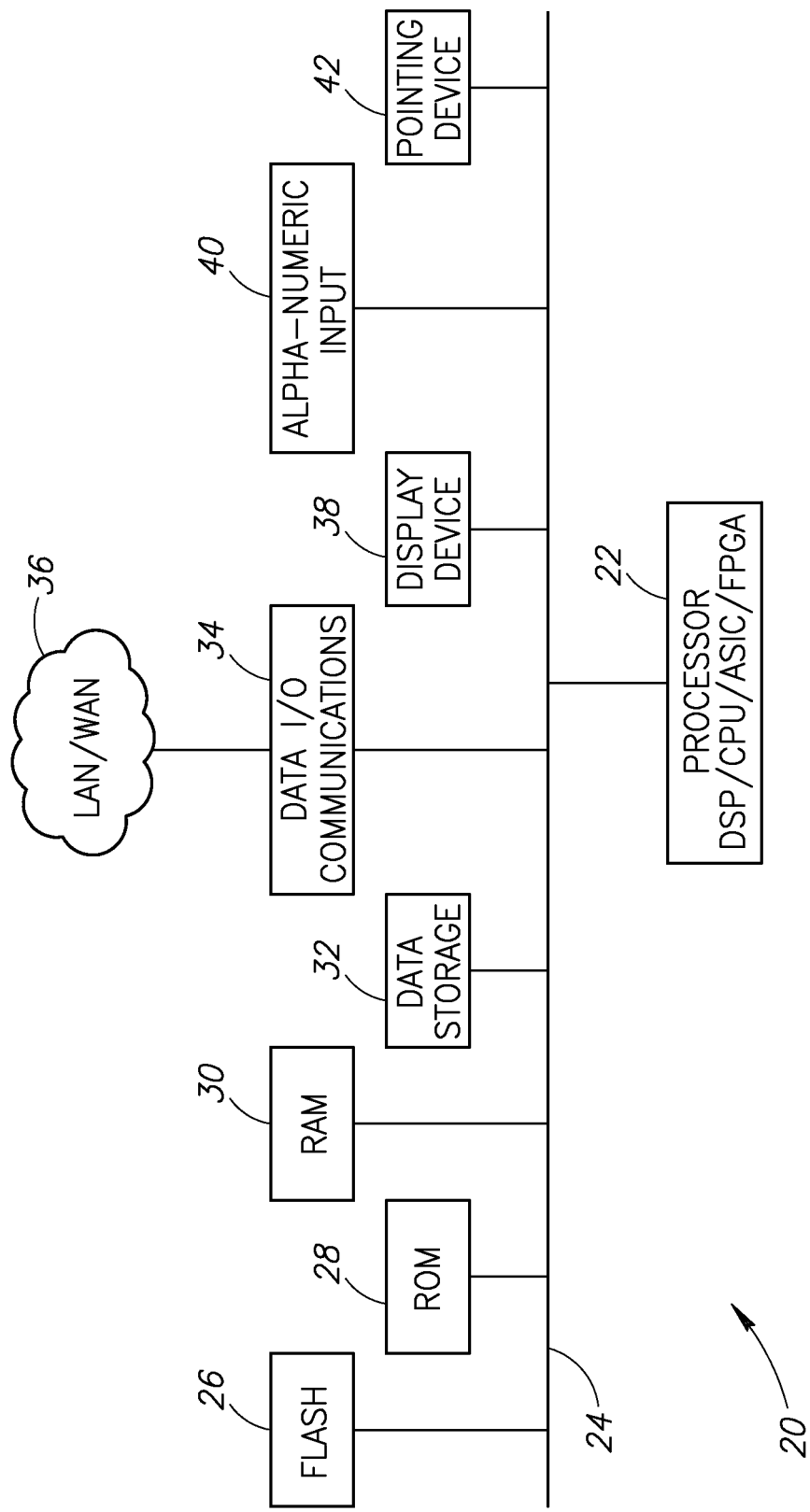
FIG. 2 is a block diagram illustrating an example computer processing system adapted to implement the system log message ranking according to system behavior mechanism of the present invention.

The following notation is used throughout this document.

| Term | Definition |
| --- | --- |
| ASIC | Application Specific Integrated Circuit |
| CD-ROM | Compact Disc Read Only Memory |
| CPU | Central Processing Unit |
| DSP | Digital Signal Processor |
| EEROM | Electrically Erasable Read Only Memory |
| FPGA | Field Programmable Gate Array |
| FTP | File Transfer Protocol |
| HDL | Hardware Description Language |
| HTTP | Hyper-Text Transport Protocol |
| I/O | Input/Output |
| LAN | Local Area Network |
| NIC | Network Interface Card |
| RAM | Random Access Memory |
| ROM | Read Only Memory |
| WAN | Wide Area Network |

DETAILED DESCRIPTION OF THE INVENTION

The present invention provides a solution to the prior art problems discussed supra by ranking system log messages by their estimated value to administrators and generating a log view that displays the most important messages. The ranking process uses a dataset of system logs from many computer systems to score messages. For better scoring, unsupervised clustering is used to identify sets of systems that behave similarly. The expected distribution of messages in a given system is estimated using the resulting clusters, and log messages are scored using this estimation.

The present invention operates in two phases, training and operation. During training, multiple log files are clustered. The clustering is based on the messages, but is indicative of actual use. Measuring the difference in the ranking of system log messages by frequency leads to better clustering results.

During operation, a log file from a new system is matched to the most similar cluster where similarity is measured according to the frequencies of its log messages. The messages with the most atypical frequency (i.e. compared to their frequency in the most similar cluster) are ranked highest and displayed. The expected distribution of messages in a given system is estimated by observing the frequency of each message in system logs of the same cluster, and system log messages are scored using this estimation. This method enables the identification of abnormal events (or ranking events according to their perceived abnormality) compared to systems which have similar uses. The process is completely unsupervised.

The invention is operative to facilitate the development of analytic tools to monitor the performance of any system generating a system log file. Automated analysis of system log files will help optimize system performance and help in the timely isolation and identification of any problems, should they occur. Both system support costs and system downtime can be reduced since the present invention provides a more efficient method for centralized help desks to detect system problems. Alternatively, the present invention can also be implemented at the remote system itself (i.e. the one to be analyzed), thereby enabling any system problems to be addressed by either the user or the local system administrator.

Some portions of the detailed descriptions which follow are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system. It has proven convenient at times, principally for reasons of common usage, to refer to these signals as bits, bytes, words, values, elements, symbols, characters, terms, numbers, or the like.

It should be born in mind that all of the above and similar terms are to be associated with the appropriate physical quantities they represent and are merely convenient labels applied to these quantities. Unless specifically stated otherwise as apparent from the following discussions, it is appreciated that throughout the present invention, discussions utilizing terms such as 'processing,' 'computing,' 'calculating,' 'determining,' 'displaying' or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Note that the invention can take the form of an entirely hardware embodiment, an entirely software/firmware embodiment or an embodiment containing both hardware and software/firmware elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A block diagram illustrating an example computer processing system adapted to implement the system log message ranking mechanism of the present invention is shown in FIG. 2. The computer system, generally referenced 20, comprises a processor 22 which may comprise a digital signal processor (DSP), central processing unit (CPU), microcontroller, microprocessor, microcomputer, ASIC or FPGA core. The system also comprises static read only memory 28 and dynamic main memory 30 all in communication with the processor. The processor is also in communication, via bus 24, with a number of peripheral devices that are also included in the computer system. Peripheral devices coupled to the bus include a display device 38 (e.g., monitor), alpha-numeric input device 40 (e.g., keyboard) and pointing device 42 (e.g., mouse, tablet, etc.)

The computer system is connected to one or more external networks such as a LAN or WAN 36 via communication lines connected to the system via data I/O communications interface 34 (e.g., network interface card or NIC). The network adapters 34 coupled to the system enable the data processing system to become coupled to other data processing systems or remote printers or storage devices through intervening private or public networks. Modems, cable modem and Ethernet cards are just a few of the currently available types of network adapters. The system also comprises magnetic or semiconductor based storage device 32 for storing application programs and data. The system comprises computer readable storage medium that may include any suitable memory means, including but not limited to, magnetic storage, optical storage, semiconductor volatile or non-volatile memory, biological memory devices, or any other memory storage device.

Software adapted to implement the system log message ranking mechanism of the present invention is adapted to reside on a computer readable medium, such as a magnetic disk within a disk drive unit. Alternatively, the computer readable medium may comprise a floppy disk, removable hard disk, Flash memory 26, EEROM based memory, bubble memory storage, ROM storage, distribution media, intermediate storage media, execution memory of a computer, and any other medium or device capable of storing for later reading by a computer a computer program implementing the method of this invention. The software adapted to implement the quality estimation mechanism of the present invention may also reside, in whole or in part, in the static or dynamic main memories or in firmware within the processor of the computer system (i.e. within microcontroller, microprocessor or microcomputer internal memory).

Other digital computer system configurations can also be employed to implement the quality estimation mechanism of the present invention, and to the extent that a particular system configuration is capable of implementing the system and methods of this invention, it is equivalent to the representative digital computer system of FIG. 2 and within the spirit and scope of this invention.

Once they are programmed to perform particular functions pursuant to instructions from program software that implements the system and methods of this invention, such digital computer systems in effect become special purpose computers particular to the method of this invention. The techniques necessary for this are well-known to those skilled in the art of computer systems.

It is noted that computer programs implementing the system and methods of this invention will commonly be distributed to users on a distribution medium such as floppy disk or CD-ROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

System Log Message Ranking Via System Behavior Analysis

In accordance with the invention, system log messages are first ranked by their estimated value to administrators. A log view is then generated which sorts the ranked log messages in order that the most important log messages are displayed first The ranking process uses a dataset of system logs from many computer systems to score messages. The present invention is comprised of two phases: training and operation.

During the training phase a large number of system logs are collected. These logs are preprocessed to transform messages into a canonical form using textual processing. This preprocessing step enables system log messages to be standardized by distilling the message to its core intention. For example, the message "User X logged in from IP address Y" would be preprocessed by removing the specific user name and IP address. The remaining text is the key point of the message for analytic purposes.

Each log is then transformed into a vector of counts, where each entry is comprised of the number of times a message has appeared in the log. The logs are then clustered according to their count vectors. The Spearman correlation coefficient is used to measure similarity between each pair of vectors. This similarity is then used as a metric to perform clustering, enabling the partition of the system logs according to system uses.

The key advantage to partitioning the system logs according to system usage is that system profiles do not need to be defined explicitly. If a computer network comprises three computer types (e.g., Windows desktops, Linux web servers and Linux email servers), the partitioning mechanism of the present invention will identify three separate clusters of system log messages. The user controls how many clusters are to be defined, but the actual clustering is performed automatically. The optimal number of clusters is realized when further separation fails to provide any benefit.

Figure 3:
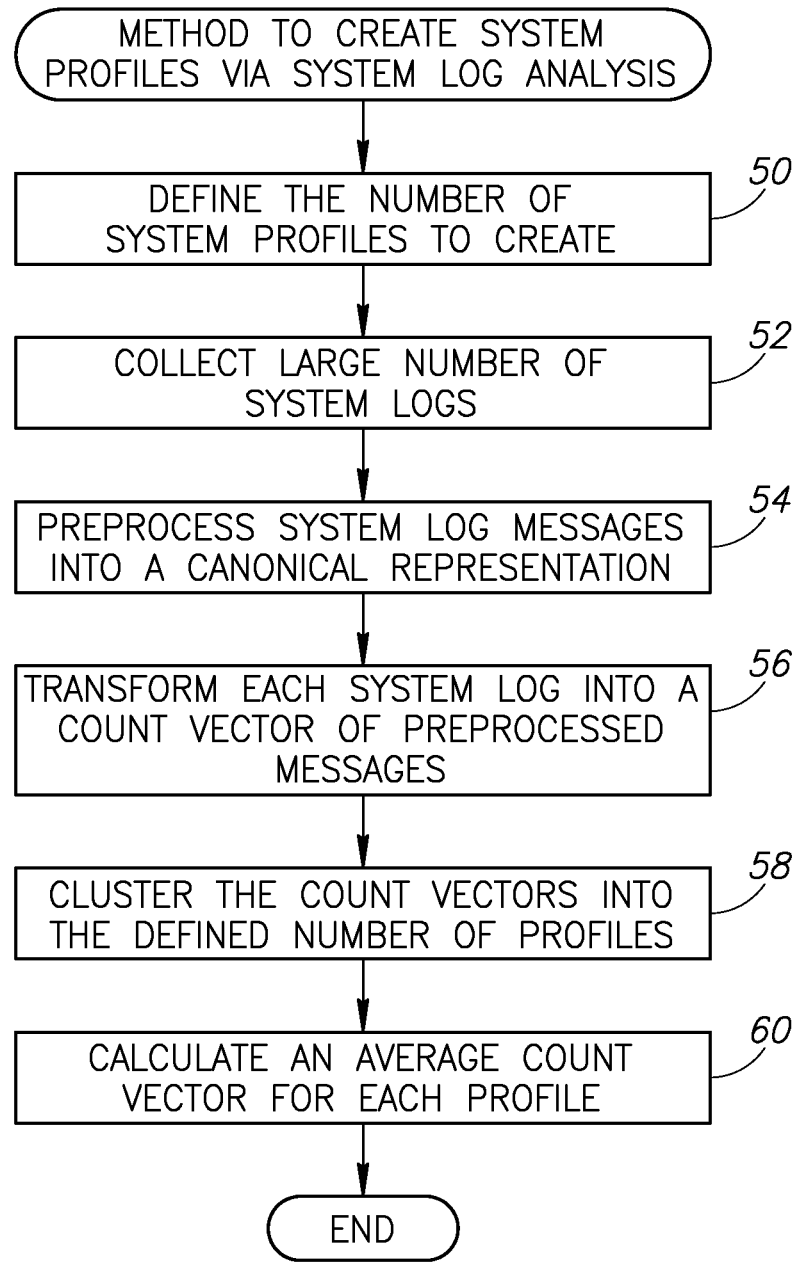
FIG. 3 is a flow diagram illustrating the system profile creation method used in the present invention.

A flow diagram illustrating the method of creating system profiles via system log analysis is shown in FIG. 3. The user first defines the number of system profiles to create (step 50). After collecting a large number of system logs (step 52), the messages in the collected system logs are preprocessed into a canonical representation using textual processing (step 54). Each system log is then transformed into a count vector representing the number of times each message appears in the log (step 56). The count vectors are then clustered into the previously defined number of profiles (step 58). Finally, an average count vector for each profile (i.e. cluster) is calculated, containing the average number of times each message appears in the profile (step 60). The average count vector represents the expected frequency of each system log message for a particular profile.

The second phase of the present invention is the operation phase. This is the phase where a specific computer (i.e. its system log) is analyzed to detect any anomalies. During this phase a new system log is first transformed into the vector of counts and assigned to a cluster which is most similar to it. The messages in the system log are then scored according to how unusual the counts of each message are compared to the average in the cluster. The highest ranked messages are then displayed, indicating the problems most evident in the current log.

The formula used to score the system log messages indicates the relationship between the frequency that a system log message occurs in the specific log and the frequency that the system log message is expected to appear for a specific profile. There are a variety of reasons why a system log message is being observed more frequently than expected. For example, it can indicate critical issues like a hardware failure, but it can also indicate that a computer is not configured correctly. For example, if a specific computer is identified as a web server (i.e. according to its profile), and the system log records that an antivirus program started running, this will result in a high score for the system log message because antivirus programs are generally not run on web servers since it will adversely affect performance.

Figure 4:
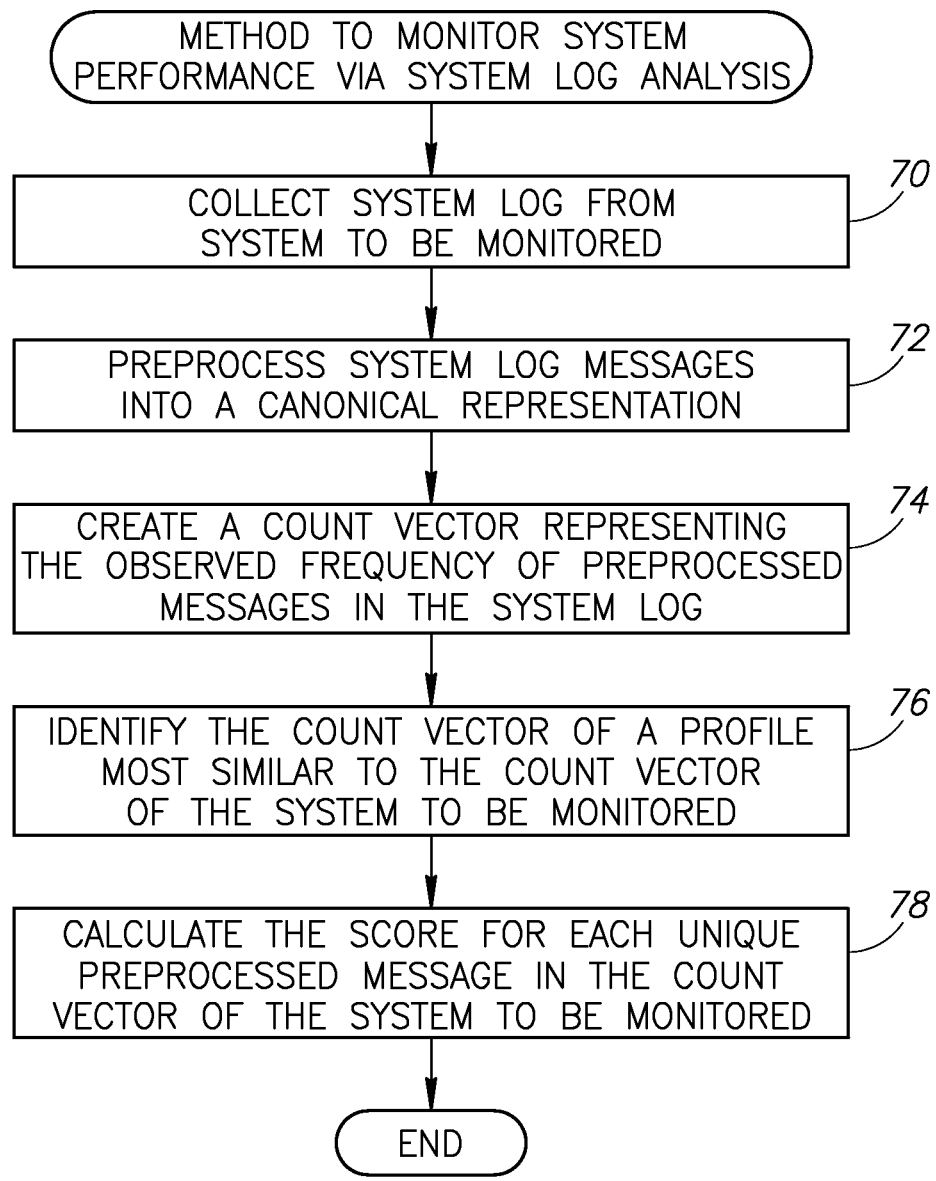
FIG. 4 is a flow diagram illustrating the system log message ranking method of the present invention.

A flow diagram showing the method to monitor system performance via system log analysis is shown in FIG. 4. First the system log is collected from the system to be monitored (step 70). The system log messages are then preprocessed into a canonical representation using textual processing (step 72). A count vector is created representing the observed frequency of each message in the system log (step 74). The count vector is then compared against all the previously defined average count vectors, and the most similar average count vector (i.e. profile) is identified (step 76). Finally a score for each system log message in the count vector is calculated (step 78).

An example of a score ranked system log of the present invention is shown in FIG. 5. The system log, generally referenced 80, comprises system log messages further comprising score 82, computer number 84, time line 86, log type 88, most recent occurrence 90 and message 92. This scored system log file monitors multiple computers and the system log messages are displayed sorted in inverse order, using score 82 as the primary key. Time line 86 is a graphical representation indicating when the specific even(s) occurred, and log type 88 indicates which profile (i.e. cluster) to which computer number 84 was assigned.

Figure 6:
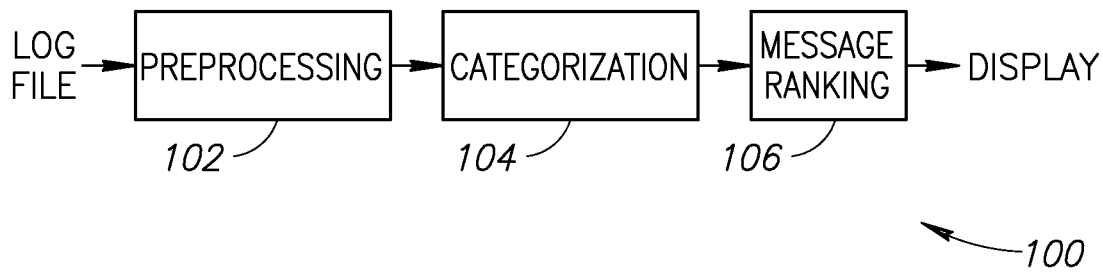
FIG. 6 is a block diagram illustrating an example computer processing system adapted to implement the system log message ranking system via system behavior analysis mechanism of the present invention.

A block diagram illustrating an example implementation of the system log message ranking via system behavior analysis mechanism of the present invention is shown in FIG. 6. The analysis block diagram, generally referenced 100 comprises preprocessing system 102, categorization system 104 and message ranking system 106. In operation a system log file is fed to the preprocessing system which transforms the system log messages into canonical representations using textual processing. The preprocessed messages are then fed into categorization system 104, which creates a count vector representing the frequency of the preprocessed system log messages. The count vector is then fed into message ranking system 106 which scores the count vector by first identifying the appropriate profile for the count vector and then calculating a score based on the frequency that a specific preprocessed message occurs and the frequency that the preprocessed message is expected to appear for the specific profile. The scored system log (i.e. count vector) is then displayed.

While the large number of system logs discussed supra are generally collected from different systems, there are instances where this is either not a viable (or desired) option. Alternatively a large number of logs can be collected from a remote system. In this case separate system log files are created by collecting system logs from the particular remote system at different time frames. This enables the remote system to create a local profile containing an average count vector indicating the expected distribution of log messages.

The present invention enables system logs to be analyzed at either a centralized help desk or at a remote system. In the case of a centralized help desk, profiles of different system types are maintained at the centralized help desk. If a problem is detected on a remote system, the system log is forwarded to the help desk, which then matches the system log to a profile. The system log is then scored to help identify the problem. System logs can also be analyzed at a remote system. In this case there are two possible sources for the system profiles, a central location such as a help desk or the remote system itself which generated the system log to be analyzed. If profiles sent from a central location (e.g., a help desk), they are matched to the local system profile to find the appropriate profile for the system log analysis, and the local system log is scored. Alternatively, a profile created on the remote system (using different time frames as discussed supra) can be used as the active profile for the system log analysis.

Clustering System Log Messages

To generate the ranked log view from the original log of a computer system, the messages in the original log are first grouped into mutually exclusive sets that correspond to message types. A message type is characterized by a base string that generates all the messages of this type, though possibly with different parameters. Grouping the messages in the original log into types is trivial if the original log specifies the source and unique identification of each message, as in the Windows System log. In this document, messages of the same type are referred to as instances of the same message, though the string parameters may differ between instances.

In the ranked log view, a single log entry is displayed for each message type that appeared in the original log. This entry lists the number of message instances, the largest common string pattern of the message instances, and the time-range in which the message instances appeared. Ranks are assigned to each message type and the lines are sorted in order of rank.

The ranking method of the present invention ranking method is based on the premise that a message in a system log is more important to the user if it has more instances in the log than is expected for this particular computer system. To formalize this notion, let us represent system log i by a vector $\vec{c}_i = (c_i[1], \ldots, c_i[n])$, where n is the number of possible message types, and $c_i[m]$ is the number of instances of message m in system log i. Also, let $P = \{p_1, \ldots, p_n\}$ be a set of probability cumulative distribution functions $p_m: \mathbb{N} \to [0,1]$, where $p_m(c)$ is the probability that message m would appear c or less times in a system log. If the probability of getting more than $c_i[m]$ instances of message type m is low, then the number of appearances of message m is more than expected, and therefore message m should be ranked higher. Therefore, the ranking of messages should approximate an ascending ordering of $(p_1(c_i[1]), \ldots, p_n(c_i[n]))$ Given a large enough dataset of system logs from actual computer systems, we can estimate P from the empirical distribution $\hat{P} = \{\hat{p}_1, \ldots, \hat{p}_n\}$ of the number of instances of each message type in each system. The Score of message type m in a log i is defined as $\hat{p}_m(c_i[m])$, and this score is used to rank the messages within the log. The messages that are top-ranked by this method usually indicate important problems in the system.

The estimation of P using the empirical distribution of the entire population is based on the implicit assumption that the population of computer systems in our dataset is homogeneous enough to treat all of them as generated from the same distribution. In actuality, different computer systems are used for very different purposes. Each purpose dictates a use-model that results in a different message probability distribution. For example, a computer system that serves as a file-server is more likely to issue "File Not Found" messages than a personal workstation. On the other hand, a personal workstation might issue more "system-restart" messages.

To improve the accuracy of the estimation of P, the computer systems are grouped into sets of systems with a similar use-model, and P is estimated separately for each set. The systems are grouped using, for example, k-means clustering on the system log dataset.

The distance metric used in the present invention to measure the similarity between the probability distribution of two log files is the Spearman Rank Correlation. Let $\vec{x}$ and $\vec{y}$ be vectors of ranks for $\vec{x}$ and $\vec{y}$, i.e. $r_x[i]=k$ if $x[i]$ is the k'th largest number in $\vec{x}$, and similarly for $\vec{r}_y$. The Spearman Rank Correlation method is defined as follows:

Let $$\vec{d} \stackrel{def}{=} \vec{r}_x - \vec{r}_y.$$

The Spearman Rank Correlation between $\vec{x}$ and $\vec{y}$ is defined by:

$$\rho(\vec{x}, \vec{y}) \stackrel{def}{=} 1 - \frac{6\|\vec{d}\|^2}{N(N^2-1)}$$

Figure 7:
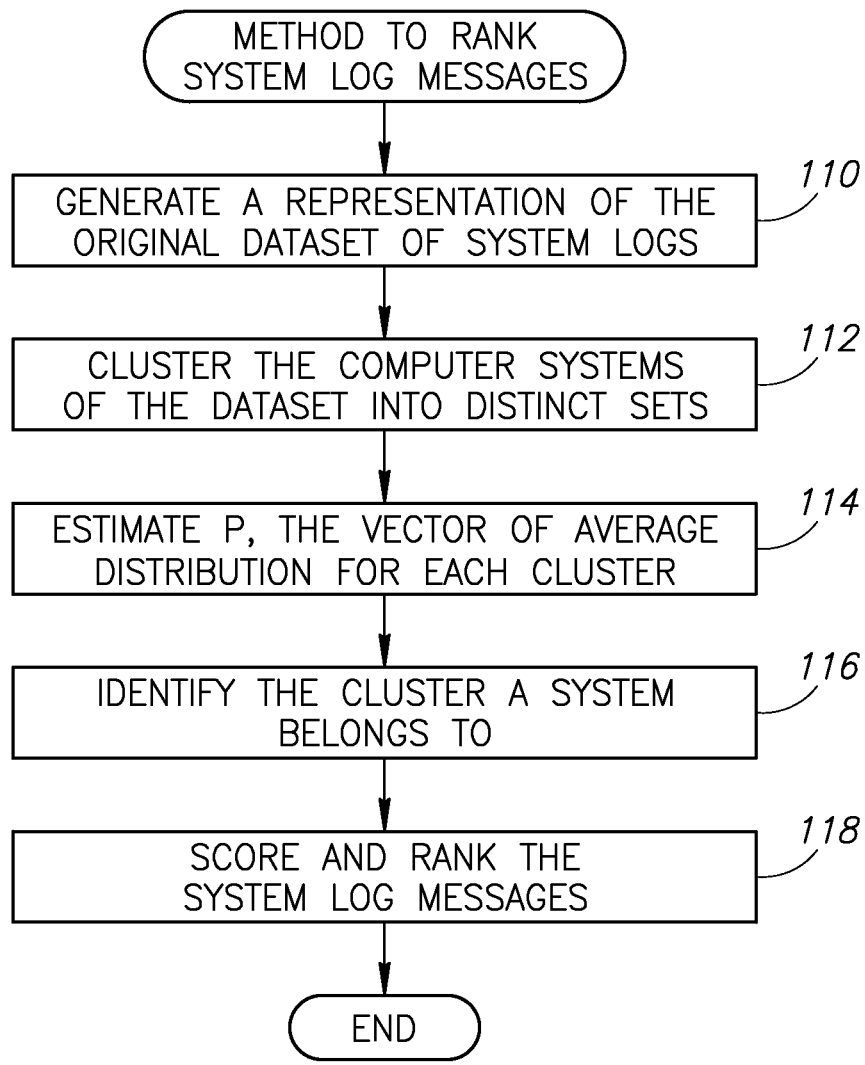
FIG. 7 is a flow diagram illustrating the system log message ranking method of the present invention.

A flow diagram illustrating the method of ranking system log messages is shown in FIG. 7. First a representation of the original dataset is generated using a feature construction scheme (step 110). Using k-means clustering, the computer systems in the dataset are divided into distinct sets (step 112). The next step is estimating P for each cluster, which represents the vector of average distribution functions, using the empirical distributions in the cluster (step 114). Finally given a system log to rank, the cluster the messages belong to is identified (116), and the messages are ranked via the score calculated from $\hat{P}$ of that cluster (step 118).

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of analyzing system logs, said method comprising the steps of:
    creating, on a computer in a preprocessing training phase, at least one system profile representing a type of system based on an expected frequency each message type appears in a training set of system logs derived from a plurality of computers;
    matching, in an operation phase, a new input system log from a computer to be analyzed to the most similar system profile created previously based on determination of a vector representing an observed frequency each message type in said new input system log appears therein;
    calculating, in said operation phase, a score for each system log message in said new input system log that is related to the probability that a corresponding message type would appear in said system profile, wherein said score represents a measure of deviation of said observed frequency from said expected frequency; and
    ranking, in said operation phase, said plurality of scored system log message types in order to identify atypical deviations of observed frequency from expected frequency for system log messages, whereby higher ranked message types have higher observed frequencies in said system log as compared to expected frequencies in said system profile generated during said preprocessing training phase.

2. The method according to claim 1, wherein said analysis is performed at a centralized help desk responsible for supporting one or more systems.

3. The method according to claim 1, wherein said system log analysis is performed at a remote system to be analyzed.

4. The method according to claim 1, wherein said step of creating at least one system profile comprises the steps of:
- collecting a plurality of training system logs from said plurality of computers;
- preprocessing messages from said training system logs into a canonical form;
- creating a vector for each input system log representing the observed frequency that each said preprocessed message type appears in a particular training system log;
- clustering said vectors into said one or more system profiles; and
- calculating an average vector for said one or more system profiles representing the average observed frequency that each said preprocessed message type appears in said one or more system profiles.

5. The method according to claim 2, wherein said step of clustering comprises calculating a correlation coefficient adapted to measure the degree of similarity between each pair of said vectors.

6. The method according to claim 1, wherein said step of matching said input system log to the most similar system profile comprises the steps of:
- preprocessing said new input system log messages into a canonical form;
- creating a vector for said new input system log representing the observed frequency that each said preprocessed message type appears therein;
- identifying the system profile most similar to said new input system log vector; and
- scoring said vector based on the probability that a message type would appear in said system profile.

7. The method according to claim 6, wherein said step of identifying comprises calculating a correlation coefficient adapted to measure the degree of similarity between said vector of said new input system log and said average vector of said system profile.

8. The method according to claim 1, wherein said score represents a relationship between said number representing the observed frequency of said preprocessed message type from said new input system log and said number representing the observed frequency of said preprocessed message types from said system profile.

9. A method of defining one or more system profiles for use in the analysis of new input system logs, said method comprising the steps of:
- collecting a plurality of training system logs derived from a plurality of computers;
- preprocessing during a training phase, on a computer, messages from said plurality of training system logs into a canonical form;
- creating a vector for each training system log representing a frequency that each said preprocessed message type appears therein;
- clustering said vectors into said one or more system profiles;
- calculating an average vector for said one or more system profiles representing an expected frequency that each said preprocessed message type appears in said one or more system profiles; and
- wherein said one or more system profiles are used during an operation phase to score and rank system log messages in a new input system log to be analyzed, whereby said ranking is carried out utilizing a score representing for a particular message type a measure of deviation of an observed frequency from said expected frequency in accordance with a corresponding system profile.

10. The method according to claim 9, wherein said step of clustering comprises calculating a correlation coefficient adapted to measure the degree of similarity between each pair of said vectors.

11. A method of ranking new input system log messages, said method comprising the steps of:
- processing during an operational phase, on a computer, said new input system log messages generated by a computer into a canonical form;
- creating a vector from said preprocessed new input system log messages in canonical form representing an observed frequency that each said preprocessed message type appears therein;
- matching said vector to a system profile created a priori during a preprocessing training phase representing an expected frequency that each message type appears in a set of training system logs; and
- calculating, during said operational phase, a score for each system log message type based on the probability that a corresponding message type would appear in said system profile, wherein said score represents a measure of deviation of observed frequency from expected frequency, whereby rankings of message types are determined based on said scores, higher ranked message types having higher observed frequencies in said system log as compared to expected frequencies in said system profile generated during said preprocessing training phase.

12. The method according to claim 11, wherein said system profile comprises an average vector representing the expected frequency of each said preprocessed message type.

13. The method according to claim 11, wherein said step of matching comprises calculating a correlation coefficient adapted to measure the degree of similarity between said vector and said system profile.

14. The method according to claim 11, wherein said score represents a relationship between said number representing the observed frequency of said preprocessed messages from said new input system log and said number representing the observed frequency of said preprocessed messages from said system profile.

15. A computer program product, comprising:
- a non-transitory computer usable machine-readable data storage medium having computer usable program code embodied therein for analyzing system log messages; said computer program product including:
- computer usable program code for creating, in a preprocessing training phase, at least one system profile representing a type of system based on an expected frequency each message type appears in a training set of system logs derived from a plurality of computers;
- computer usable program code for matching, in an operation phase, a new input system log, generated by a computer, to be analyzed to the most similar system profile created previously based on determination of a vector representing an observed frequency each message type in said new input system log appears therein;
- computer usable program code for calculating, in an operation phase, a score for each system log message from said new input system log that is related to the probability that a corresponding message type would appear in said system profile, wherein said score represents a measure of deviation of said observed frequency from said expected frequency; and computer usable program code for ranking, in said operation phase, said scored system log message types to identify any atypical deviations of observed frequency from expected frequency for system log messages, whereby higher ranked message types have higher observed frequencies in said new input system log as compared to expected frequencies in said system profile generated during said preprocessing training phase.

16. The computer program product according to claim 15, wherein said step of creating at least one system profile comprises the steps of:
collecting a plurality of training system logs from said plurality of computers;
preprocessing messages from said training system logs into a canonical form;
creating a vector for each input system log representing the observed frequency that each said preprocessed message type appears in a corresponding training system log;
clustering said vectors into said one or more system profiles; and
calculating an average vector for said one or more system profiles representing the average observed frequency that each preprocessed message type appears in said one or more system profiles.

17. The computer program product according to claim 15, wherein said step of clustering comprises calculating a correlation coefficient adapted to measure the degree of similarity between each pair of said vectors.

18. The computer program product according to claim 15, wherein said step of matching said new input system log to the most similar system profile comprises the steps of:
preprocessing said input system log messages into a canonical form;
creating a vector for said system log representing the observed frequency that each said preprocessed message type appears in said input system log;
identifying the system profile most similar to said new input system log vector; and
scoring said vector based on the probability that a message type would appear in said system profile.

19. The computer program product according to claim 15, wherein said step of identifying comprises calculating a correlation coefficient adapted to measure the degree of similarity between said vector of said new input system log and said average vector of said system profile.

20. The computer program product according to claim 15, wherein said score represents a relationship between said number representing the observed frequency of said preprocessed message type from said new input system log and said number representing the observed frequency of said preprocessed message type from said system profile.

\* \* \* \* \*